United States Patent [19]
Davis et al.

[11] Patent Number: 4,788,889
[45] Date of Patent: Dec. 6, 1988

[54] MECHANICAL TRANSMISSION AND CONTROL METHOD THEREFOR

[75] Inventors: Alan R. Davis, Plainwell; John R. Vandervoort, Richland, both of Mich.

[73] Assignee: Eaton Corporation, Cleveland, Ohio

[21] Appl. No.: 27,987

[22] Filed: Mar. 19, 1987

[51] Int. Cl.$^4$ .......................... F16H 3/08; F16H 5/40
[52] U.S. Cl. ........................................ 74/745; 74/331; 74/335
[58] Field of Search ............... 74/331, 333, 363, 364, 74/375, 745, 335, 336 R

[56] References Cited

U.S. PATENT DOCUMENTS

| | | | |
|---|---|---|---|
| 2,618,979 | 11/1952 | Benning | 74/745 X |
| 2,654,268 | 10/1953 | Perkins | 74/745 |
| 3,105,395 | 10/1963 | Perkins | 74/745 |
| 3,283,613 | 11/1966 | Perkins | 74/745 |
| 3,362,245 | 1/1968 | Francuch et al. | 74/745 X |
| 3,648,546 | 3/1972 | McNamara et al. | 74/331 X |
| 3,802,293 | 4/1974 | Winckler et al. | 74/745 |
| 3,834,499 | 9/1974 | Candellero et al. | 192/0.09 |
| 4,060,005 | 11/1977 | Bost | 74/745 |
| 4,388,843 | 6/1983 | Teeter | 74/745 |
| 4,527,447 | 7/1985 | Richards | 74/336 R X |

FOREIGN PATENT DOCUMENTS

| | | | |
|---|---|---|---|
| 117342 | 9/1984 | European Pat. Off. | 74/745 |
| 2736834 | 2/1979 | Fed. Rep. of Germany | 74/331 |

*Primary Examiner*—Rodney H. Bonck
*Assistant Examiner*—Dwight G. Diehl
*Attorney, Agent, or Firm*—H. D. Gordon

[57] ABSTRACT

A change gear transmission (12) is provided having an input component (16, 24, 26, 26A, 50, 53, 54 and 56), a connecting component (28, 60, 62, 64 and 80) and an output component (74) and includes a coupling (76) for drivingly connecting and disconnecting the connecting component from the output component. Preferably, the coupling is a positive clutch of the type having relatively low backlash between the interengaging clutch teeth (334, 336, 338, 340) to resist asynchronous engagement thereof.

19 Claims, 12 Drawing Sheets

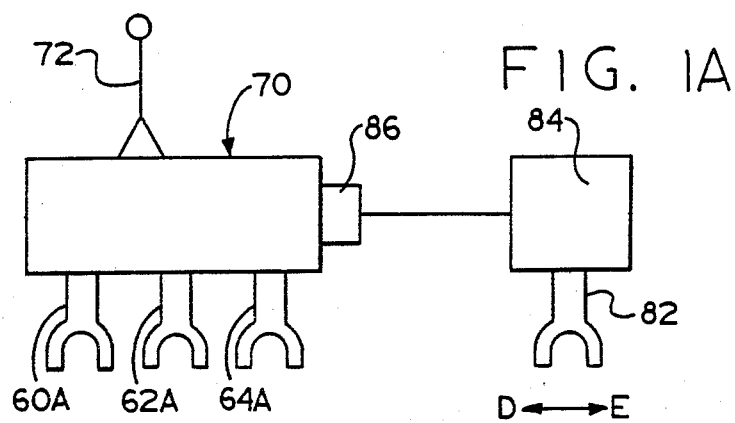
FIG. IA
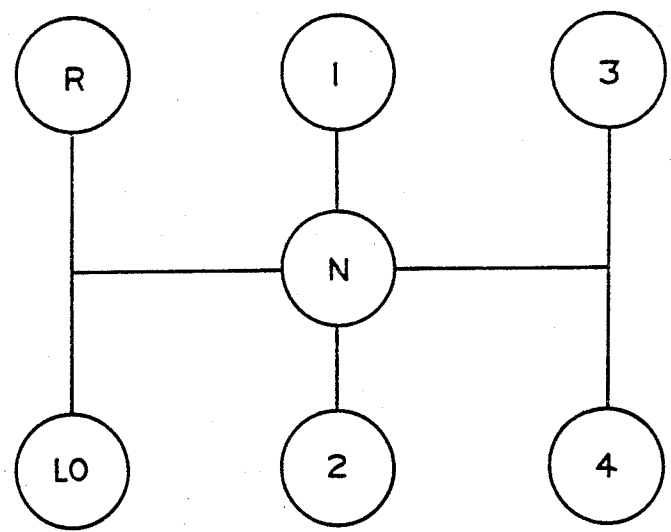
FIG. IB

| RATIO NO. | HIGH RANGE | LOW RANGE |
|---|---|---|
| 16 | 0.86 | |
| 15 | 1.00 | |
| 14 | 1.16 | |
| 13 | 1.35 | |
| 12 | 1.56 | |
| 11 | 1.82 | |
| 10 | 2.10 | |
| 9 | 2.46 | |
| 8 | | 2.84 |
| 7 | | 3.36 |
| 6 | | 3.88 |
| 5 | | 4.54 |
| 4 | | 5.25 |
| 3 | | 6.12 |
| 2 | | 7.07 |
| 1 | | 8.26 |
| Lo | | 13.08 |
| LoLo | | 15.17 |

| RATIO NO. | MAIN SECTION GEAR ENGAGED TO MAINSHAFT | GEAR ENGAGED BY CLUTCH 126 | GEAR ENGAGED BY CLUTCH 128 |
| --- | --- | --- | --- |
| LoLo | 56 | 120 | 124 |
| Lo | 56 | 118 | 124 |
| 1 | 54 | 120 | 124 |
| 2 | 54 | 118 | 124 |
| 3 | 52 | 120 | 124 |
| 4 | 52 | 118 | 124 |
| 5 | 50 | 120 | 124 |
| 6 | 50 | 118 | 124 |
| 7 | 24 | 120 | 124 |
| 8 | 24 | 118 | 124 |
| 9 | 54 | 120 | 120 |
| 10 | 54 | 118 | 120 |
| 11 | 52 | 120 | 120 |
| 12 | 52 | 118 | 120 |
| 13 | 50 | 120 | 120 |
| 14 | 50 | 118 | 120 |
| 15 | 24 | 120 | 120 |
| 16 | 24 | 118 | 120 |
| $R_{LO}$ | 58 | 120 | 124 |
| $R_H$ | 58 | 120 | 120 |

MECHANICAL TRANSMISSION AND CONTROL METHOD THEREFOR

BACKGROUND OF THE INVENTION

1. Field of the Invention

The present invention relates to a control mechanism and a control method for providing substantially smoother and less complicated shifting of mechanical change gear transmissions.

2. Description of the Prior Art

Mechanical change gear transmissions, i.e. transmissions providing a plurality of selectable gear ratios between the input and output members thereof, which ratios are selected by the engagement and disengagement of positive (i.e. jaw type) clutches, are well known in the prior art.

Compound change gear transmissions of the type having one or more auxiliary sections connected in series with a main transmission section are well known in the prior art. Briefly, by utilizing main and auxiliary transmission sections connected in series, assuming proper sizing of the ratio steps, the total of available transmission ratios is equal to the product of the main and auxiliary section ratios. By way of example, at least in theory, a compound change gear transmission comprising a four (4) speed main section connected in series with a three (3) speed auxiliary section will provide twelve ($4 \times 3 = 12$) available ratios.

Auxiliary transmission sections are of three general types: range type, splitter type or combined range/splitter type.

In compound transmissions having a range type auxiliary section, the ratio step or steps are greater than the total ratio coverage of the main transmission section and the main section is shifted progressively through its ratios in each range. Examples of compound transmissions having range type auxiliary sections may be seen by reference to U.S. Pat. Nos. 3,105,395; 2,637,222 and 2,637,221, the disclosures of which are hereby incorporated by reference.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having splitter type auxiliary sections may be seen by reference to U.S. Pat. Nos. 4,290,515; 3,799,002; 4,440,037 and 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing the main section ratios to be split in at least one range.

One example of a compound transmission having a single combined range/splitter type auxiliary section may be seen by reference to U.S. Pat. Nos. 3,283,613; 3,648,546, the disclosures of which are hereby incorporated by reference and to publication Small Scale Print No. 016-AD; Fuller Transmissions; Models RT-14613, RTO-14613, RTOO-14613, published March 1981 by Eaton Corporation, assignee of this invention, the disclosure of which is hereby incorporated by reference. Another example is the "Ecosplit" model of transmission sold by Zahnradfabrik Friedrichshafen Aktiengeseushaft of Friedrichshafen, Federal Republic of Germany which utilizes a separate splitter auxiliary section in front of, and a separate range auxiliary section behind, the main transmission section.

It should be noted that the terms main and auxiliary sections are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forward speed ratios, which allows selection of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

While the use of positive jaw clutches is highly desirable in view of the relative simplicity, low, inertia, low cost and reliability thereof, mechanical change gear transmissions, especially manually operated change gear transmissions, have not been totally satisfactory as, to change gear ratio in vehicles having "crash" gear boxes without synchromesh, the driver must increase or decrease the speed of the transmission input shaft relative to that of the output shaft while in neutral gear with the clutch engaged, which is a delicate operation requiring skill and practice on the part of the driver. To free the driver from the necessity of double-clutching type gear synchronization during a gear changing operation, it is known to provide synchronous jaw clutch assemblies in a so-called synchromesh gear box which, during a gear change, will equalize the speed of gears before their interengagement. While the use of synchromesh gear boxes does free the driver from the necessity of being preoccupied with gear synchronizations during a gear changing operation, the use of synchromesh transmissions adds substantial cost, complication and space requirements to the transmission and, especially in heavy duty vehicles, requires the operator to utilize an extremely high amount of force to bring the jaw clutch members into synchronous rotation.

It has also been suggested to utilize electronic synchronization devices, usually comprising various speed sensors and independent power synchronizer devices to automatically bring the jaw clutches of selected ratio gears into substantial synchronization. Transmissions utilizing such power synchronization devices may be seen by reference to U.S. Pat. Nos. 3,834,499 and 3,478,851, the disclosures of which are hereby incorporated by reference. While such power synchronization devices will greatly simplify the operation of change gear transmissions, especially of manually operated change gear transmissions, they do add considerably to the cost of providing and maintaining such transmissions.

Fully or semi-automated mechanical transmissions are also know in the prior art and may be appreciated in greater detail by reference to U.S. Pat. Nos. 4,361,060; 4,527,447 and to published European patent application No. 85305072.2, publication No. 0170465, the disclosures of which are hereby incorporated by reference. While the ease of operation makes such fully or semi-automated transmissions highly desirable, such transmissions may be more complicated and/or expensive then is desired for certain purposes.

SUMMARY OF THE INVENTION

In accordance with the present invention, the drawbacks of the prior art have been overcome to the extent that a control mechanism and a control method for a mechanical change gear transmission, preferably a manually operated nonsynchronized transmission, is provided which substantially reduces the level of skill required for shifting nonsynchronized mechanical transmissions and will provides smoother engagement of jaw clutches which may be engaged under somewhat nonsynchronous conditions. It is understood, that the term "transmission" as used herein refers to both simple transmissions and to transmission sections, such as the main transmission section of compound transmissions.

The above is accomplished by providing a mechanical change gear transmission having an input component such as an input shaft and the transmission gearing constantly driven thereby, a connecting component such as the mainshaft of a compound transmission, an output component such as the output shaft for driving the vehicle drive wheels, a plurality of jaw clutch members for selectively drivingly coupling the connecting component to the input component at a selected gear ratio and a coupling member for selectively engaging and disengaging the output component from the connecting component. Control means are provided for placing the coupling member in the disengaged condition whenever the main transmission is shifted into the neutral condition. Preferably, the control means will automatically sense shifting of the transmission to neutral to automatically disengage the coupling member. By disengaging the connecting component from the output component with the transmission in neutral, the connecting component is disengaged from both the input component and the output component and thus is at a relatively low rotational inertia allowing the transmission jaw clutch members to be engaged at somewhat asynchronous conditions without objectionable harshness nor damage to the jaw clutches.

Accordingly, it is an object of the present invention to provide a transmission control mechanism and control method, preferably for a manually operated nonsynchronized mechanical transmission, which will simplify the shifting of mechanical transmissions by reducing the necessity for precise synchronization of the engaging jaw clutches.

This and other objects and advantages of the present invention will become apparent from a reading of the detailed description of the preferred embodiment taken in connection with the attached drawings.

DESCRIPTION OF THE DRAWINGS

FIG. 1A is a schematic illustration of the control mechanism for controlling the transmission of FIG. 1.

FIG. 1B is a schematic illustration of the shift pattern for the transmission illustrated in FIG. 1.

FIG. 6 is a chart illustrating typical ideal ratios for a compound change gear transmission of the type illustrated in FIG. 4.

FIG. 7 is a chart illustrating the clutch positions for the various selectable ratios of a compound transmission of the type illustrated in FIG. 4.

DESCRIPTION OF THE PREFERRED EMBODIMENTS

Figure 1:
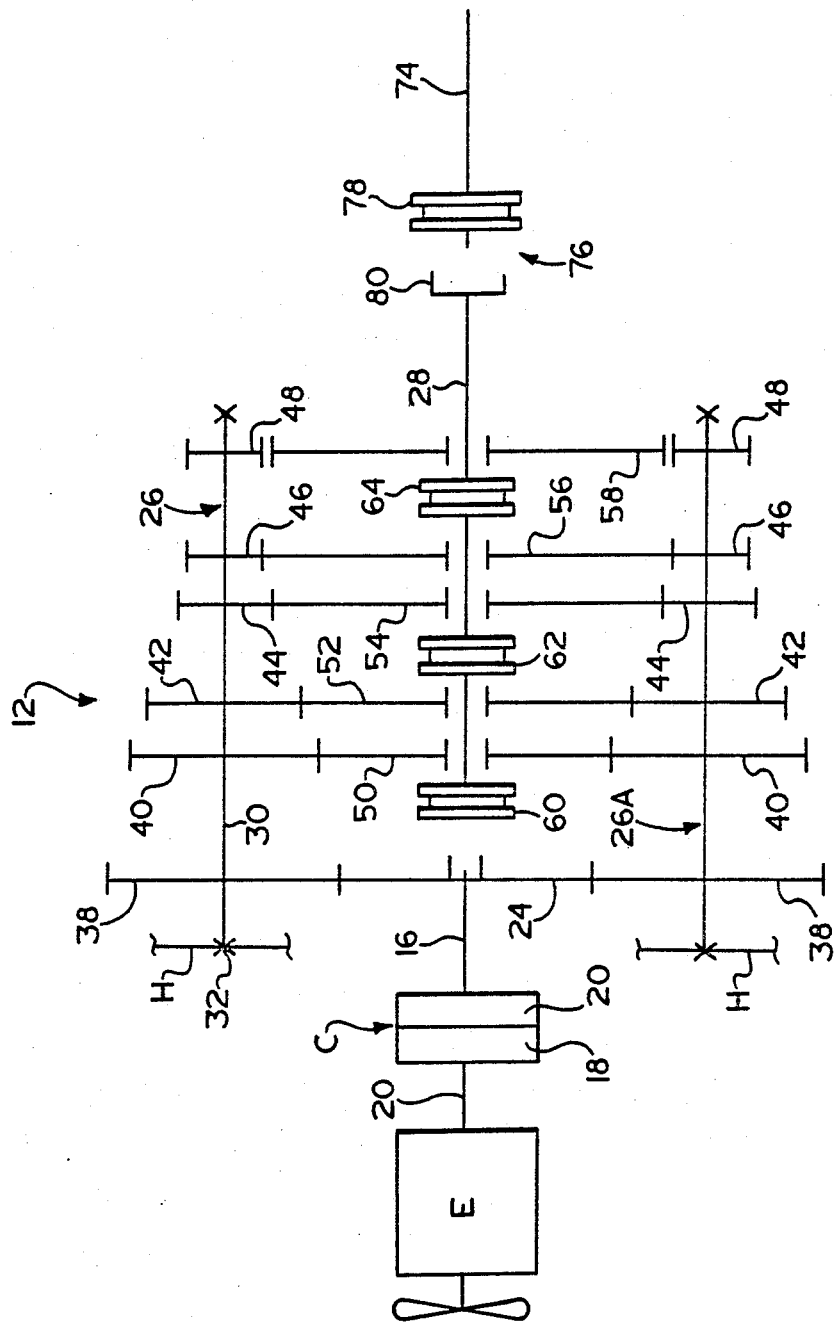
FIG. 1 is a schematic illustration of a simple transmission utilizing the control mechanism and control method of the present invention.

Certain terminology will be used in the following description for convenience only and will not be limiting. The words "upwardly", "downwardly", "rightwardly" and "leftwardly" will designate directions in the drawings to which reference is made. The words "forward", "rearward" will refer respectively to the front and rear ends of the transmission as conventionally mounted in the vehicle, being respectively from the left and right side of the transmission as illustrated in FIG. 1. The words "inwardly" and "outwardly" will refer to directions toward and away from, respectively, the geometric center of the device and designated parts thereof. Said terminology includes the words above specifically mentioned, derivatives thereof and words of similar input.

The term "compound transmission" is used to designate a change speed or change gear transmission having a main transmission section and an auxiliary transmission section connected in series whereby the selected gear reduction in the main transmission section may be compounded by further selected gear reduction in the auxiliary transmission section. The term "upshift" as used herein shall mean the shifting from a lower speed gear ratio to a higher speed gear ratio. The term "downshift" as used herein shall mean the shifting from a higher speed gear ratio to a lower speed gear ratio. The terms "low speed gear" or "low gear" as used herein shall designate a gear ratio utilized for relatively lower forward speed operation in a transmission, i.e., a set of gears having a higher ratio of reduction of output shaft speed relative to the speed of the input shaft. "Synchronize clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation and relative large capacity friction means are associated with the clutch members and are sufficient, upon initiation of a clutch engagement, to cause the clutch members and all members rotating therewith to rotate at a substantially synchronous speed.

Referring now to FIG. 1, there is schematically illustrated a simple transmission 12 of the well known and highly commercially successful twin countershaft type. It is understood that transmission 12 could comprise a main transmission section connected in series with an auxiliary transmission section having range and/or splitter type gearing. The term simple transmission as used herein shall refer to simple transmissions and to transmission sections of compound transmissions. Typically, transmission 12 is housed within a housing H and includes an input shaft 16 driven by a prime mover such as diesel engine E through a selectively disengaged, normally engaged friction master clutch C having an input or driving portion 18 drivingly connected to the engine crank shaft 20 and a driven portion 22 rotatably fixed to the transmission input shaft 16.

In transmission 12, the input shaft 16 carries an input gear 24 for simultaneously driving a plurality of substantially identical countershaft assemblies 26 and 26A at substantially identical rotational speeds. In the transmission 12 illustrated, two substantially identical countershaft assemblies are provided on diametrically opposite sides of a mainshaft 28, which mainshaft is generally coaxially aligned with the input shaft 16. Each of the countershaft assemblies 26 and 26A comprises a countershaft 30 supported by bearings 32 and 34 in housing H, only a portion of which is schematically illustrated. Each of the countershafts 30 is provided with an identical grouping of countershaft gears 38, 40, 42, 44, 46 and 48, fixed for rotation therewith. A plurality of drive or mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the art. Clutch collar 60 may also be utilized to clutch input gear 24 to mainshaft 28 to provide a direct drive relationship between input shaft 16 and mainshaft 28.

Preferably, each of the mainshaft gears encircles the mainshaft 28 and is in continuous meshing engagement with and is floatingly supported by the associated countershaft gear group, which mounting means and a special advantages resulting therefrom are explained in greater detail in U.S. Pat. Nos. 3,105,395 and 3,335,616, the disclosures of which are hereby incorporated by reference. Typically, clutch collars 60, 62 and 64 are axially positioned by means of shift forks 60A, 62A and 64A, respectively, associated with a shift bar housing assembly 70 (See FIG. 1A) as well known in the prior art. Clutch collars 60, 62 and 4 are of the well known nonsynchronized double acting jaw clutch type.

It is understood that although the present invention is illustrated in connection with transmissions of the well known and commercially successful multiple identical countershaft, floating mainshaft and floating mainshaft gear type, and while the present invention is particularly well suited for such transmission structure, the advantages of the present invention are equally applicable to transmissions of the single countershaft or nonidentical multiple countershaft type. Additionally, although the present invention is illustrated in, and is most advantageously utilized in connection with, manually operated transmissions, the invention is also equally applicable to semi or fully automated mechanical transmissions of the types illustrated in above-mentioned U.S. Pat. Nos. 4,361,060, 4,527,447 and published European patent application No. 85305072.2.

Mainshaft gear 58 is the reverse gear and is in continuous meshing engagement with countershaft gears 48 by means of conventional intermediate idler gears (not shown). It should also be noted that while transmission section 12 does provide five selectable forward speed ratios, the lowest forward speed ratio, namely, that ratio provided by drivingly connected mainshaft drive gear 56 to mainshaft 28, is often of such a high gear reduction as to be considered a low or "creeper" gear which is utilized only for starting of a vehicle under severe conditions and, if transmission 12 is utilized as the main transmission section of a compound transmission, is usually not utilized in the high transmission range and/or may not be split in the low transmission range. Accordingly, while transmission 12 illustrated does provide five forward speeds, if utilized as a main section, it is usually referred to as a "4+1" main section as only four of the forward speeds are compounded by the auxiliary transmission section utilized therewith.

Jaw clutches 60, 62 and 64 are three-position clutches in that they may be positioned in a centered, nonengaged position as illustrated or in a fully rightwardly engaged or fully leftwardly engaged position by means of a shift lever 72. As is well known, only one of clutches 60, 62 and 64 is engagable at a given time and interlock means are provided to lock the other clutches in the neutral condition. The shift pattern for transmission 12 is schematically illustrated in FIG. 1B.

Transmission 12 of the present invention differs from known prior art transmissions in that mainshaft 28 is not the output member of the transmission but is drivingly engagable and disengagable to an output shaft 74 by means of a selectively, preferably automatically operated, engagable and disengagable coupling means 76. Output shaft 74 is normally drivingly coupled to the vehicle's drive wheels by means of a transfer case and/or drive axle mechanism, as is well known in the prior art.

The coupling mechanism 76 is preferably in the form of a positive clutch comprising a sliding collar 78 rotationally fixed and axially movable relative to output shaft 74 and a mating positive clutch member 80 rotationally fixed to mainshaft 28. Clutch collar 78 is preferably axially positioned by means of a shift fork 82 of substantially conventional design. Shift fork 82 is axially positioned by a relatively low force actuator 84 which may comprise a compressed air actuated piston and/or a relatively low force spring mechanism. Actuator 84 is controlled by a control mechanism 86 which is associated with the shift bar housing 70 and will sense the positioning of all of the transmission shift forks 60A, 62A and 64A into a neutral position and will provide a signal indicative thereof to the actuator 84. Examples of sensors for sensing the neutral condition of shift rails may be seen by reference to U.S. Pat. No. 4,445,393, the disclosure of which is hereby incorporated by reference. Preferably, the backlash of the positive clutch teeth associated with jaw clutch members 78 and 80 of coupling 76 is relatively low, the backlash in the sliding connection between clutch member 78 and output shaft 74 is relatively low and the interengaging clutch teeth are provided with leading conical angles of about 35° relative to the axis of rotation thereof (the advantages of which are discussed in U.S. Pat. No. 3,265,173, the disclosure of which is hereby incorporated by reference). Additionally, the clutch members 78 and 80 are of a significantly larger radius than clutches 60, 62 and 64. These features, as will be discussed in greater detail below, along with the relatively low force provided by actuator 84, provide a clutch assembly which will only engage as the mainshaft 28 and output shaft 74 are rotating at a substantially synchronous speed.

The operation of transmission 12 is as follows. When a ratio change is required, for example, a ratio change from second speed to third speed, the operator must disengage mainshaft gear 54 from mainshaft 28 and then engage mainshaft gear 52 to mainshaft 28. Utilizing the transmission 12 of the present invention, the operator will disengage clutch C, or at least decrease the supply of fuel to engine E, to relieve torque on the transmission allowing clutch 62 to be disengaged from gear 54 by means of shift lever 72. As clutch 62 is brought to the neutral position illustrated in FIG. 1, sensor/control mechanism 86 will sense the neutral condition of transmission 12 and will cause actuator 84 to place coupling 76 in the disengaged condition as illustrated in FIG. 1. In this condition, mainshaft 28 is disconnected from all of the inertia of the input members of the transmission and is also disconnected from the inertia of the output shaft 74. Accordingly, the rotational inertia of the mainshaft assembly comprises only the rotational inertia of the mainshaft 28 and of the jaw clutch member 60, 62 and 64. In view of this relatively low inertia, re-engaging one of the jaw clutches at substantially out of synchronous conditions will not result in an unduly harsh shift nor damage to the jaw clutch members themselves as the mainshaft assembly will quickly be caused to rotate synchronously with the engaged jaw clutch member rotating with the input members of the transmission. Accordingly, jaw clutch member 62 is caused to engage gear 52 with mainshaft 28. The sensor mechanism 86 will sense that the transmission 12 is no longer in the neutral condition and will cause actuator 84 to urge coupling member 76 into an engaged or preselect condition. By a relatively simple manipulation of the engine throttle, the jaw clutch members 80 and 78 are caused to briefly rotate substantially synchronously (i.e pass through synchronous) and will smoothly come into engagement completing the transmission shift. While the operation of actuator 84 is preferably automatically controlled by sensor actuator 86, the present invention is also applicable to transmission systems wherein coupling 76 is manually controlled.

While shifting of the transmission 12 by means of the well known "double clutching" method to first break torque for disengaging a currently engaged gear ratio, shifting the transmission into neutral, re-engaging the clutch to bring the jaw clutch members to be engaged into substantially sychronous rotation, disengaging the clutch to break torque while shifting the synchronized clutch into engagement and then re-engaging the clutch is the preferred method of shifting transmission 12, the present invention allows the transmission to be shifted without requiring disengagement of the clutch nor requiring precise synchronization of the jaw clutch members.

Transmission 12 may be considered as comprising an input component, a connecting component and an output component. The output component comprises output shaft 74 and jaw clutch member 78 and is of a relatively high inertia as it is drivingly connected to the vehicle drive wheels. The input component comprises input shaft 16 and at least driven clutch member 22 and all of the gearing constantly rotated by the inputs shaft 16. This gearing includes input gear 24 all of the countershaft gearing associated with the countershaft assemblies 26 and 26A, and drive or mainshaft gears 50, 52, 54, 56 and 58. Accordingly, it may be seen that the input component of transmission 12 is of a relatively high rotative inertia. The connecting component comprises countershaft 28, the sliding jaw clutches 60, 62 and 64, and jaw clutch member 80. Accordingly, it may be seen that the connecting component 28, with transmission 12 in the neutral condition, is of a relatively low rotating inertia.

It is important that the coupling 76 be of the type which will only re-engage upon the positive members thereof achieving a substantially synchronous rotation to assure smooth and nondestructive re-engagement of the driveline. To accomplish this, preferably the coupling 77 will be of the preselect type wherein the member will be urged together by means of a relatively low force compressible fluid or spring actuator and the clutch members will have a relatively low backlash between the interengaging members thereof. To cause the coupling to reengage upon re-engagement of one of the sliding jaw clutch members 60, 62 or 64 with a selected new gear ratio, the coupling 76 will preferably be automatically preloaded towards re-engagement and then the vehicle operator need simply manipulate the throttle to cause the positive jaw clutch members to cross synchronous wherein the clutch members will automatically be reengaged. Of course, causing a passing through synchronous is a considerably easier task then causing two clutch members to maintain a synchronous rotation.

It is noted that shift bar housing assembly is of a relatively standard simple well known structure which may be utilized for the present invention as well as transmissions provided according to the prior art.

In transmissions including an input component, a connecting component (usually including the mainshaft) and an output component, if the mainshaft is connected to a larger inertia, an asynchronous shift will cause objectionable driveline shock and/or damage. However, if the mainshaft is only connected to relatively small diameter clutches (such as clutches 60, 62 and 64), an asynchronous shift will not result in objectionable driveline shock or damage.

In the present invention, the combination of easily engaged clutches 60, 62 and 64 on the mainshaft (relatively large backlash, relatively large force applicable by shift lever 72) with the coupling 76 which requires relatively close synchronous but is preloaded to shift during a crossing of synchronous, provides an exceptionally easily shifted manual transmission. Clutches preloaded to shift during a crossing of synchronous may be seen by reference to U.S. Pat. Nos. 3,799,002; 4,132,122 and 4,375,172, the disclosures of which are hereby incorporated by reference.

Figure 2:
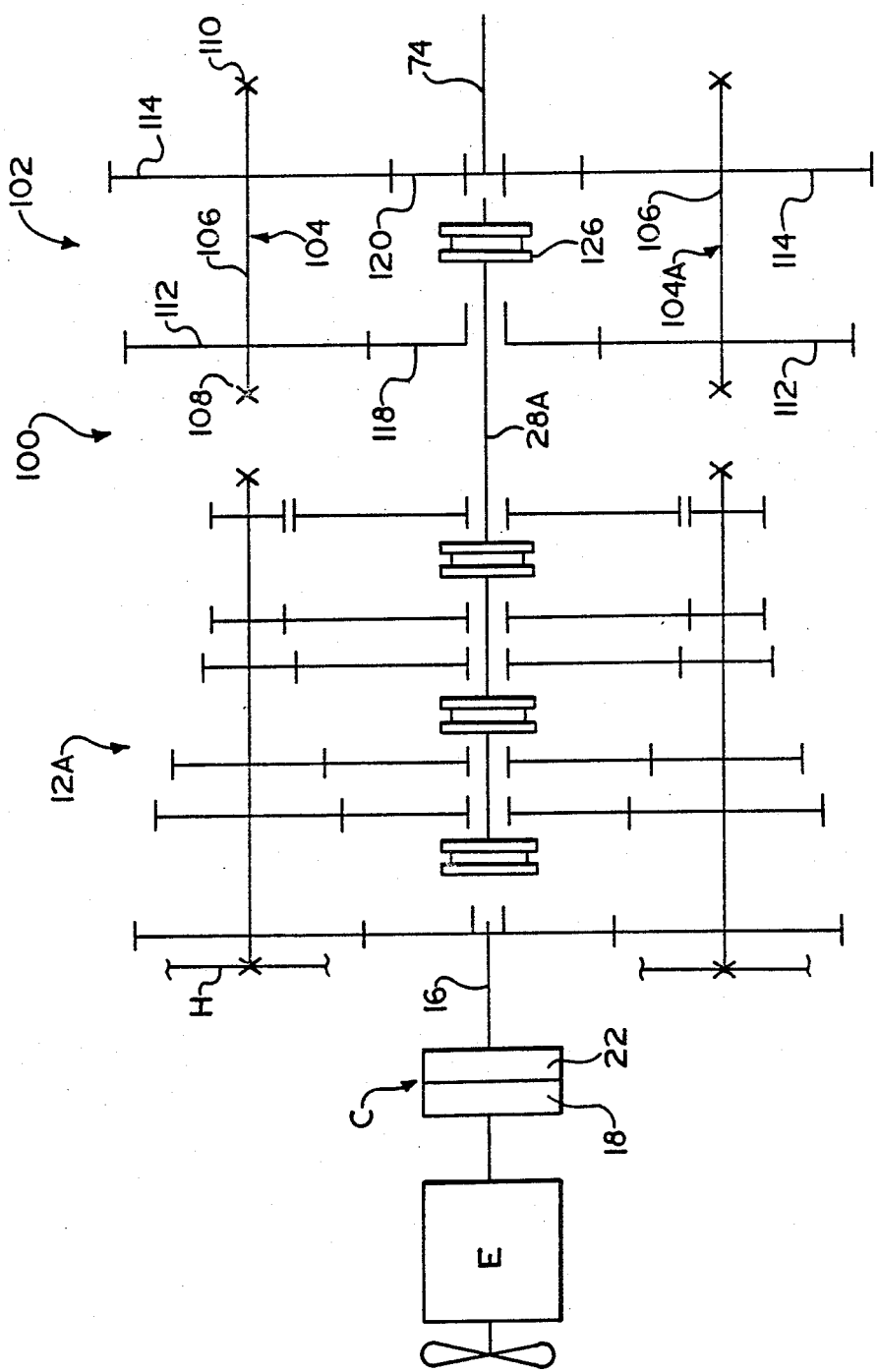
FIG. 2 is a schematic illustration of a compound transmission having a splitter type auxiliary section utilizing the control mechanism and method of the present invention.
Figure 2A:
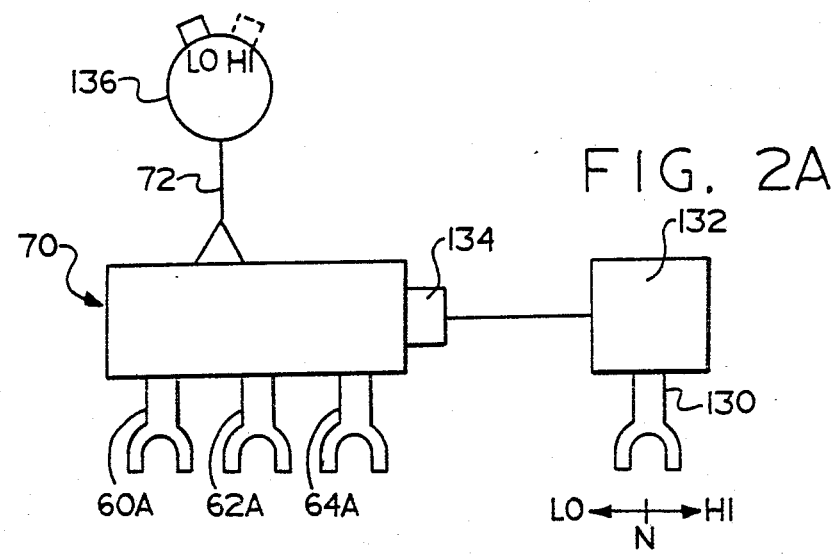
FIG. 2A is a schematic illustration of the control mechanism for controlling the transmission of FIG. 2.
Figure 2B:
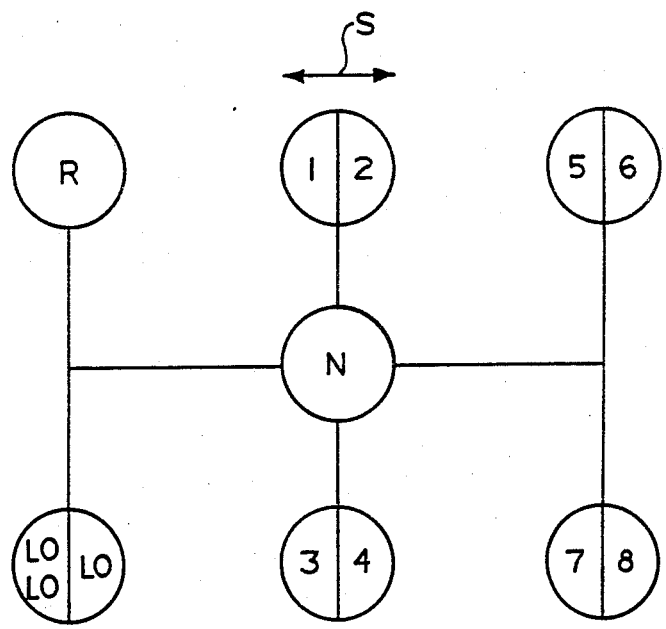
FIG. 2B is a schematic illustration of the shift pattern for the transmission of FIG. 2.

Referring to FIGS. 2, 2A and 2B, a splitter type compound change gear mechanical transmission 100 including the improved control apparatus of the present invention may be seen. Compound change gear transmission 100 is a 10 forward speed transmission comprising a main transmission section 12A, substantially identical to transmission 12 described above, and an auxiliary transmission section 102. In the descriptions of the preferred embodiments of the present invention, elements having identical or substantially identical structure and function as elements previously described will be assigned like reference numerals and will not be described in greater detail again. Main transmission section 12A of transmission 100 differs from transmission 12 only in that mainshaft 28A extends into the auxiliary transmission section 102 and may be connected to the output shaft 74 by means of the splitter type auxiliary section gearing. In view of the substantially identical structure of transmission 12 and main transmission section 12A, main transmission section 12A will not be described again in detail.

Auxiliary transmission section 102 includes two substantially identical auxiliary countershaft assemblies 104 and 104A, each comprising an auxiliary countershaft 106 supported by bearings 108 and 110 in housing H and carrying two auxiliary section countershaft gears 112 and 114 fixed for rotation therewith. Auxiliary countershaft gears 112 are constantly meshed with and support auxiliary section splitter gear 118 which surrounds mainshaft 28A. Auxiliary countershaft gears 114 are constantly meshed with and support splitter/output gear 120 which surrounds the output shaft 74 and is fixed for rotation therewith.

A sliding jaw clutch collar 126 is fixed for rotation to mainshaft 28A and is utilized to selectively couple either the splitter gear 118 or the output gear 120 to the mainshaft 28A. Sliding clutch collar 126 is a double acting sliding jaw clutch member substantially identical to the structure and function of sliding clutch collars 60, 62 and 64 with the exception that, preferably, the clutch is of a larger diameter than collars 60, 62 and 64 allowing more precise backlash control and the backlash between the jaw clutch members is relatively small as was the case with coupling 76 described above.

Sliding jaw clutch collar 126 is actually positioned by a shift fork 130 controlled by actuator 132. As will be described in greater detail below, actuator 132 differs from remote auxiliary section actuators utilized in the prior art in that actuator 132 is a three position device having a first position wherein clutch 126 drivingly couples gear 118 to output shaft 28A, a second position when clutch 126 drivingly couples gear 120 to mainshaft 28A and a third position, intermediate the above two positions, wherein mainshaft 28A is disengaged from both of the auxiliary section drive gears.

Main transmission section 12A is shifted by means of shift bar housing assembly 70 and shift lever 72 as is well known in the prior art. As is also well known in the prior art concerning compound transmissions, shift lever 72 is provided with a two position switch, preferably on the shift knob, 74, allowing the auxiliary transmission section to be shifted to its high (direct) or low (gear reduction) ratios. In the high or direct drive condition, jaw clutch 126 drivingly connects the mainshaft 28A directly to output gear 120 and output shaft 74 rotating therewith. In the gear reduction mode, jaw clutch 126 connects mainshaft 28A to splitter gear 118 and thus the output shaft 74 is driven through the auxiliary section countershaft assemblies 104 and 104A, as is well known in the prior art.

The control for transmission 100 includes a sensing member 134 for sensing the position of switch 136 and also for sensing the neutral condition of transmission section 12A in a manner similar to the sensor 86 described above. The operation of transmission 100 is as described below.

For a splitter only type of shift, i.e. a shift from third to fourth gear, the auxiliary section shift is preselected by switch 136, the operator will release the throttle allowing the auxiliary section clutch 126 to disengage and to be biased towards re-engagement in the newly selected auxiliary section ratio, and then the throttle is manipulated to cause a passing through synchronous type of shift. This type of splitter only shifting is well known in the prior art. For a compound type shift, i.e. a shift in both the main transmission section and the auxiliary transmission section, i.e. a shift from second to third gear, the auxiliary section shift is first preselected, the main clutch C is preferably disengaged allowing the operator to shift the main transmission section into neutral. At this time, sensor 134 will cause the auxiliary section to be placed into the neutral condition as illustrated in FIG. 2, and the main section may be easily shifted into the newly selected ratio. Upon completion of the main section shift, the sensor 134 will sense an absence of a neutral condition in the main transmission section and cause the auxiliary section to be resiliently preloaded biased towards engagement of the selected auxiliary section ratio. By manipulation of the throttle, the vehicle operator will cause passing through synchronous at which time the auxiliary section shift will be completed.

In the event the operator desires to execute a skip shift, i.e. a shift from second to fourth gear, he will cause a breaking of torque by disengagement of the clutch and/or and releasing of the throttle and will shift the main transmission section 12A into neutral. At this time, sensor 134 will cause the auxiliary section to be shifted into neutral and the shift will be completed substantially identical to completion of the shift described in connection with the transmission 12 described above.

It is important to note that the structure of the auxiliary section allows the connecting component, i.e. mainshaft 28A and sliding clutch members 60, 62, 64 and 126 to be disengaged from both the input member and the output members upon shifting of clutch 126 to the neutral condition thereof. In this condition, the rotating inertia of the connecting member is relatively low allowing the smooth and easy shifting of the present invention. In the transmission illustrated in connection with FIG. 2, the output component thereof comprises output shaft 74 and all of the gearing constantly rotating therewith, i.e. output gear 120, auxiliary countershaft assemblies 104 and 104A and splitter gear 118.

Figure 3:
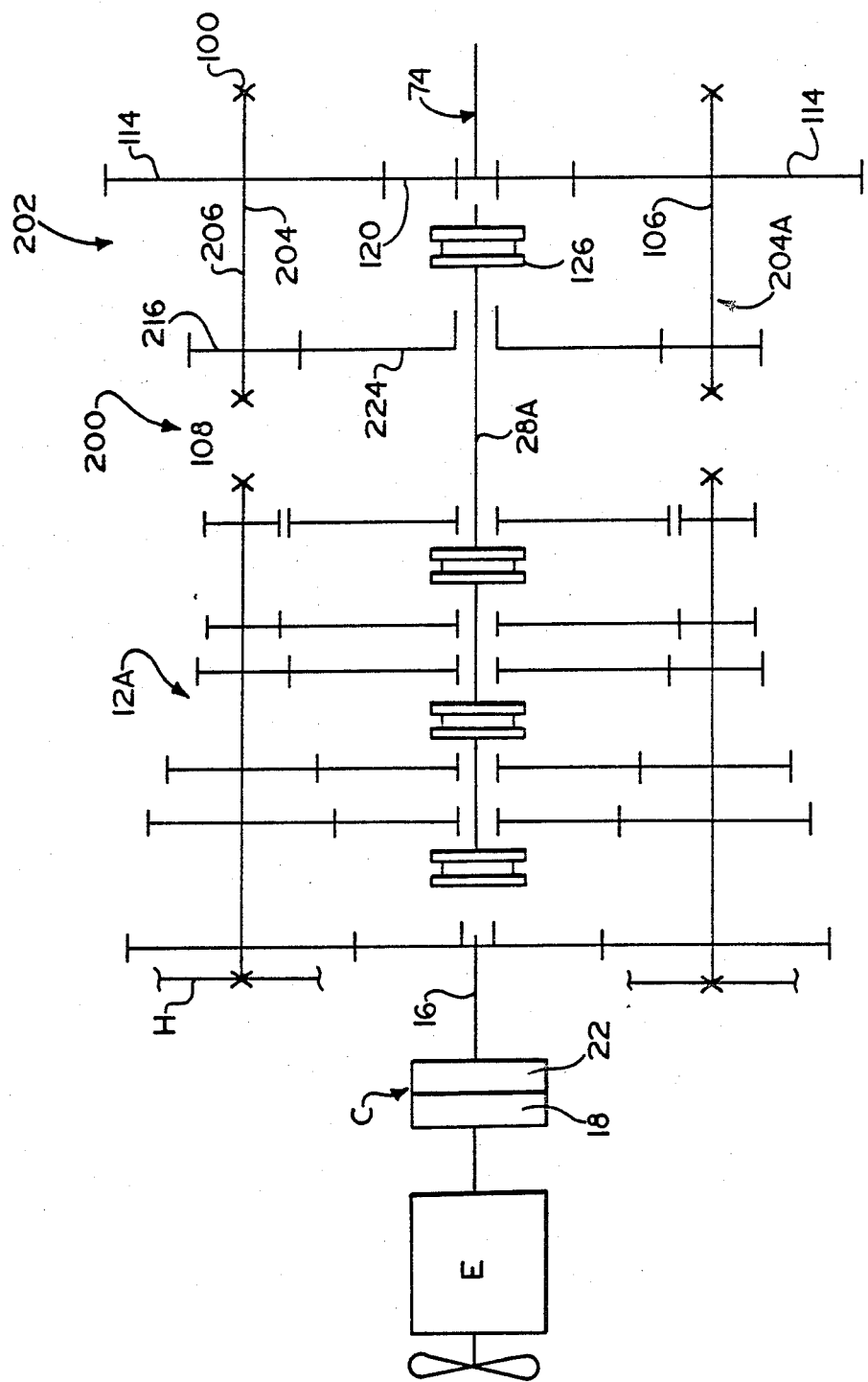
FIG. 3 is a schematic illustration of a compound transmission having a range type auxiliary section and utilizing the control mechanism and control method of the present invention.
Figure 3A:
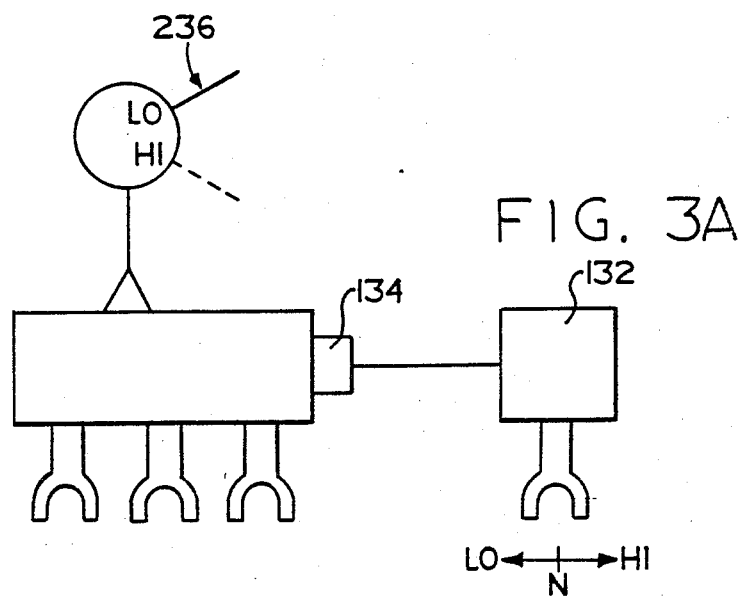
FIG. 3A is a schematic illustration of the control mechanism for controlling the transmission of FIG. 3.
Figure 3B:
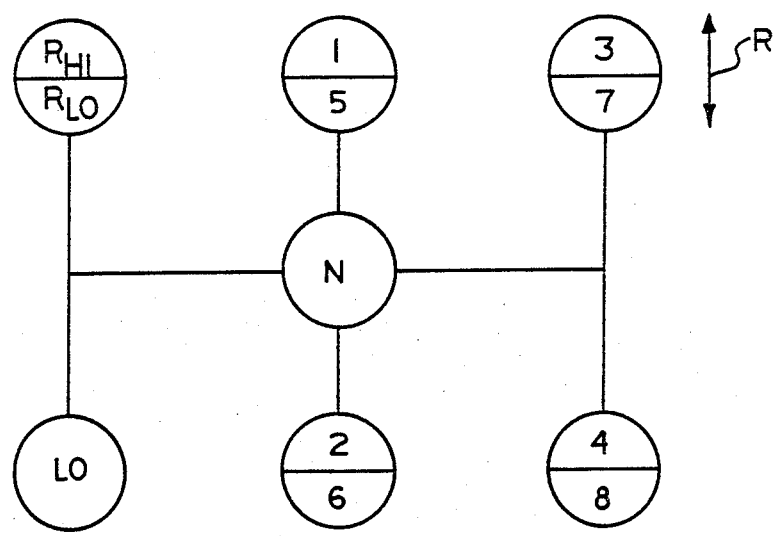
FIG. 3B is a schematic illustration of the shift pattern of the transmission of FIG. 3.

Referring to FIGS. 3, 3A and 3B, a range type compound change gear mechanical transmission 200 including the improved control apparatus of the present invention may be seen. Change gear transmission 200 is a nine forward speed transmission comprising a main section 12A connected in series with a range type auxiliary section 202. Range type auxiliary section 202 differs from splitter type auxiliary section 102 described above only in the ratio of the gearing and the shift pattern utilized to operate control switch 236.

Referring to FIGS. 4, 4A, 4B, 5A, 5B, 6 and 7, a compound splitter/range type compound change gear mechanical transmission 300 utilizing the improved control apparatus of the present invention may be seen. Change gear transmission 300 is an 18 forward speed transmission comprising a main transmission section 12A, identical, or substantially identical, to transmission 12 described above, which is connected in series with a combined splitter/range type auxiliary transmission section 302. In view of the substantially identical structure of transmission 12 and main transmission section 12A, main transmission section 12A will not be described again in detail.

Auxiliary transmission section 302 includes two substantially identical auxiliary countershaft assemblies 304 and 304A, each comprising an auxiliary countershaft 306 supported by bearings 308 and 310 in housing H and carrying three auxiliary section countershaft gears 112, 114 and 216 fixed for rotation therewith. Auxiliary countershaft gears 112 are constantly meshed with and support auxiliary section splitter gear 118 which surrounds mainshaft 28A. Auxiliary countershaft gears 114 are constantly meshed with and support auxiliary section splitter/range gear 120 which surrounds the output shaft 322 at the end thereof adjacent the coaxial end of mainshaft 28A. Auxiliary section countershaft gears 216 constantly mesh and support auxiliary section range gear 224, which surrounds the output shaft 322. Accordingly, auxiliary section countershaft gears 112 and splitter gear 118 define a first gear layer, auxiliary section countershaft gears 114 and splitter/range gear 120 define a second gear layer and auxiliary section countershaft gears 216 and range gear 224 define a third layer, or gear group of the combined splitter and range type auxiliary transmission section 302.

A sliding three-position jaw clutch collar 126 is utilized to selectively couple either the splitter gear 118 or the splitter/range gear 120 to the mainshaft 28A, or to disconnect both gears 118 and 120 from the mainshaft 28A. A two-position synchronized assembly 328 is utilized to selectively couple the splitter/range gear 120 or the range gear 224 to the output shaft 322. The structure and function of double acting sliding jaw clutch collar 126 is substantially identical to the structure and function of sliding clutch collars 126 utilized in connection with transmissions 100 and 200 described above while the structure and function of double acting synchronized clutch assembly 328 is substantially identical to the structure and function of synchronized clutch assemblies utilized in connection with prior art transmissions. Synchronized clutch assemblies such as assembly 328 are well known in the prior art and examples thereof may be seen by reference to U.S. Pat. Nos. 4,462,489; 4,125,179 and 2,667,955, the disclosures of all of which are incorporated by reference.

Figure 5A:
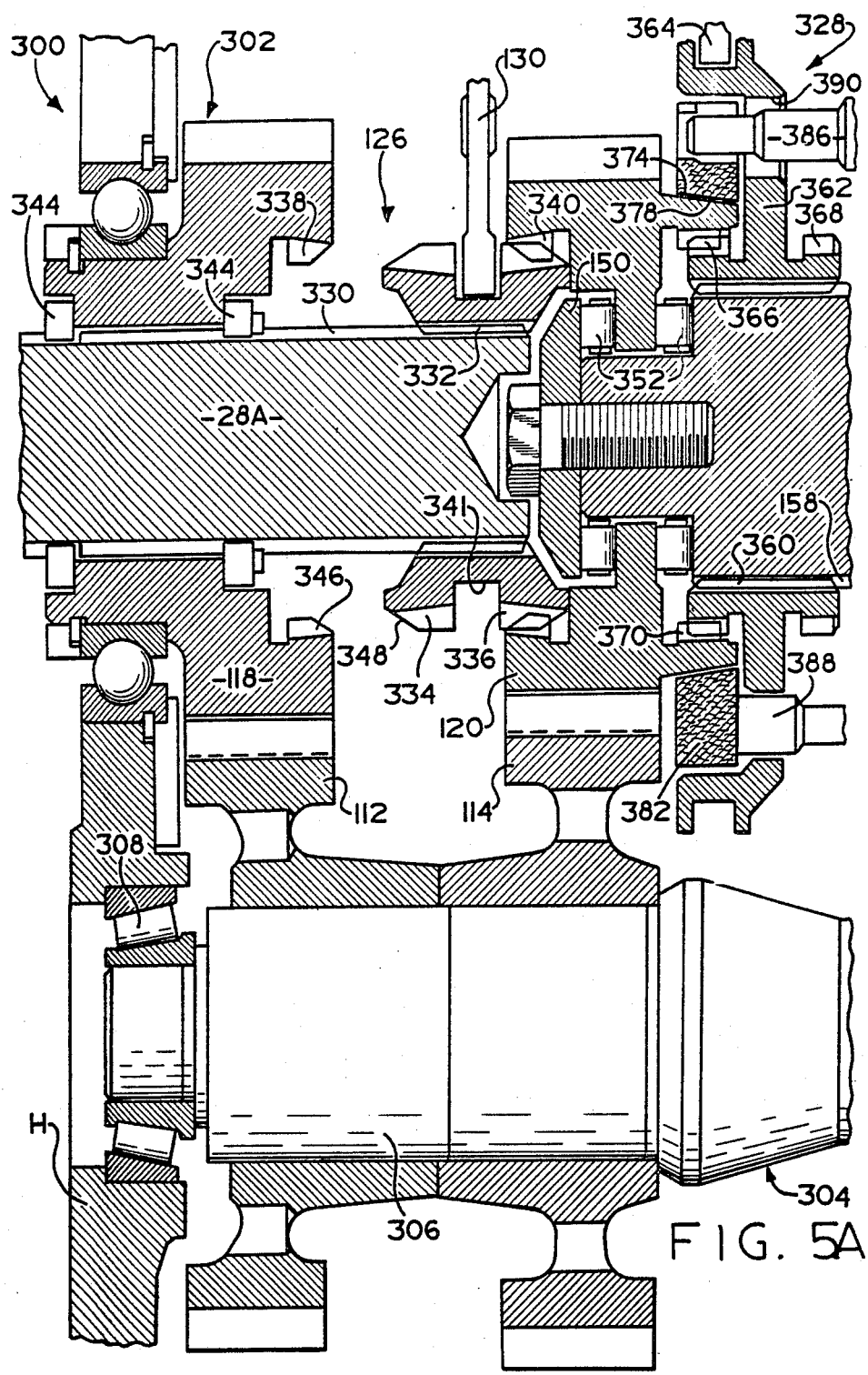
FIGS. 5A and 5B are a plan view, in section, of the auxiliary section of the transmission illustrated in FIG. 4.
Figure 5B:
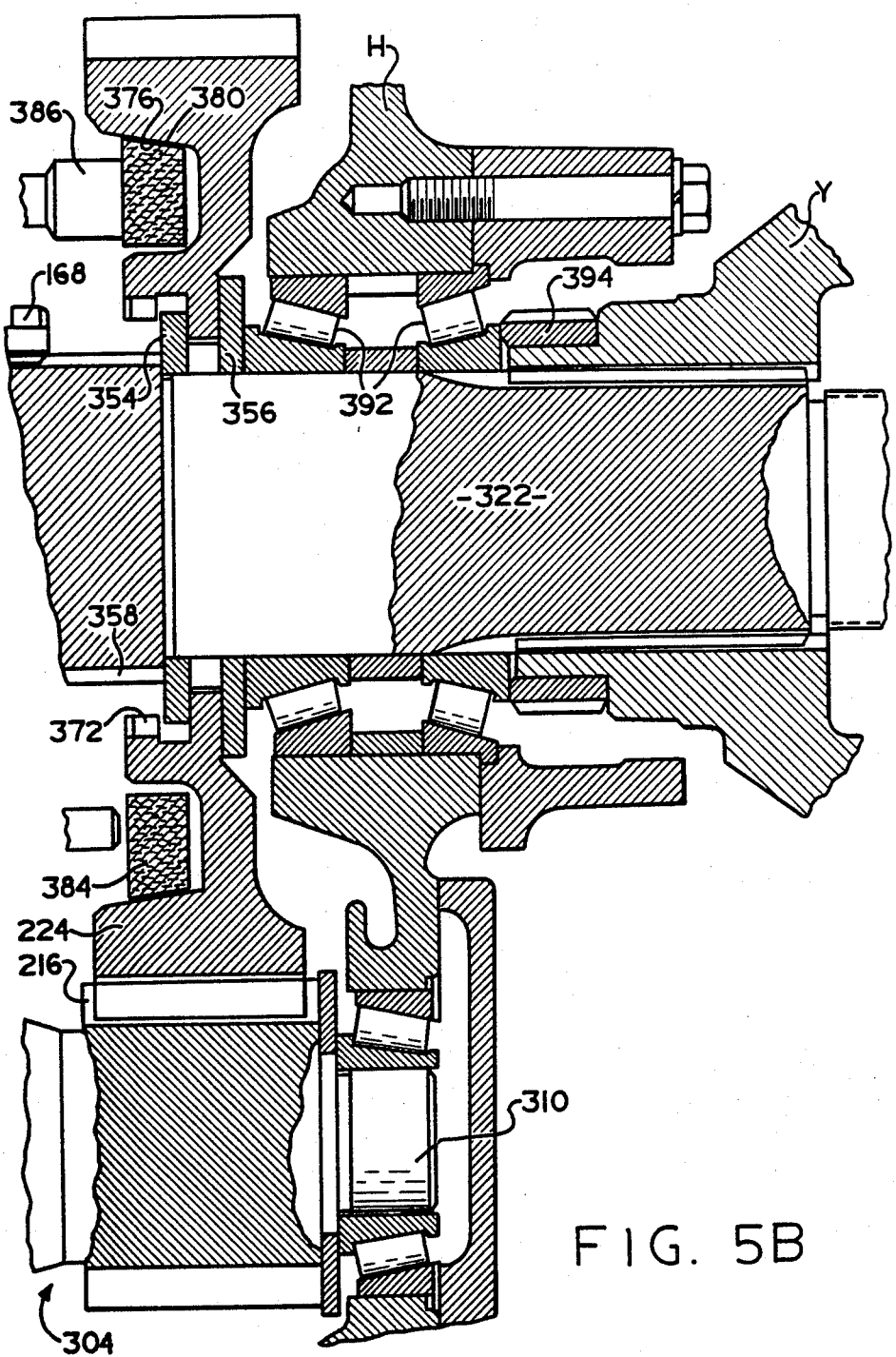

The detailed structure of the preferred embodiment of auxiliary section 302 is illustrated in FIGS. 5A and 5B, wherein it may be seen that the rearward end of mainshaft 28A extending into the auxiliary transmission section 302 is provided with external splines 330 which mate with internal splines 332 provided on clutch collar 126 for rotationally coupling clutch collar 126 to the mainshaft 28A while allowing relative axial movement therebetween. The clutch collar 126 is provided with clutch teeth 334 and 336 for selective axial engagement with clutch teeth 338 and 340 provided on gears 118 and 120, respectively, for receipt of a shift fork 130. Clutch collar 328 is provided with groove for receipt of shift fork 364.

Gear 118 surrounds mainshaft 28A by means of retainers free to rotate relative thereto and is axially retained relative to the mainshaft 28A by means of retainers 344. Clutch teeth 336 and 338 present tapered surfaces 346 and 348 which are inclined at bout 35° relative to the axis of the mainshaft 28A which provides an advantageous interaction tending to resist nonsynchronous engagement and also tending to cause a synchronous rotation as is described in greater detail in U.S. Pat. No. 3,265,173, the disclosure of which is hereby incorporated by reference. Clutch teeth 336 and 340 are provided with similar complementary tapered surfaces. As described above, the use of tapered surfaces 346 and 348, along with utilizing a relatively low backlash structure, at both the clutch teeth and the splined connection 330–332, and relatively low axial engagement forces results in a coupling member which will tend to resist engagement at asynchronous conditions.

Splitter/range gear 120 is rotatably supported at the inward end 350 of output shaft 322 by means of a pair of thrust bearings 352 while range gear 224 surrounds the output shaft 322 and is axially retained thereon by means of thrust washers 354 and 356. Located axially between gears 120 and 224, and rotationally fixed to output shaft 122 by means of external splines 358 and internal splines 360, is the double acting two position synchronized clutch assembly 328. Many of the well known synchronized positive clutch structures are suitable for use in the auxiliary transmission section of the present invention. The synchronized clutch assembly 328 illustrated is of the pin type described in above mentioned U.S. Pat. No. 4,462,489. Briefly, the synchronized clutch assembly 328 includes a slidable jaw clutch member 362 axially positioned by a shift fork 364 and carrying clutch teeth 366 and 368, respectively, for axial engagement with clutch teeth 370 and 372, respectively, carried by gears 120 and 224, respectively. Gears 120 and 224 define cone friction surfaces 374 and 376, respectively, for frictional synchronizing engagement with matching frictional cone surfaces 378 and 380, respectively, carried by the friction rings 382 and 384, respectively, of the synchronized clutch assembly. Blocker pins 386 and 388 are rotationally fixed to the friction rings 384 and 382, respectively, and interact with blocker openings 390 carried by the sliding member 362 to provide the blocking function as is well known in the prior art. Synchronizing assembly 328 may also include a plurality of spring pins (not shown) for providing initial engagement of the conical friction surfaces at the initiation of a clutch engagement operation.

Output shaft 322 is supported by bearings 392 in housing H and extends therefrom for attachment of a yolk member Y or the like which typically forms a portion of a universal joint for driving a propeller shaft to a differential or the like. The output shaft 122 may also carry a speedometer gear 394 and/or various sealing elements (not shown).

Figure 4:
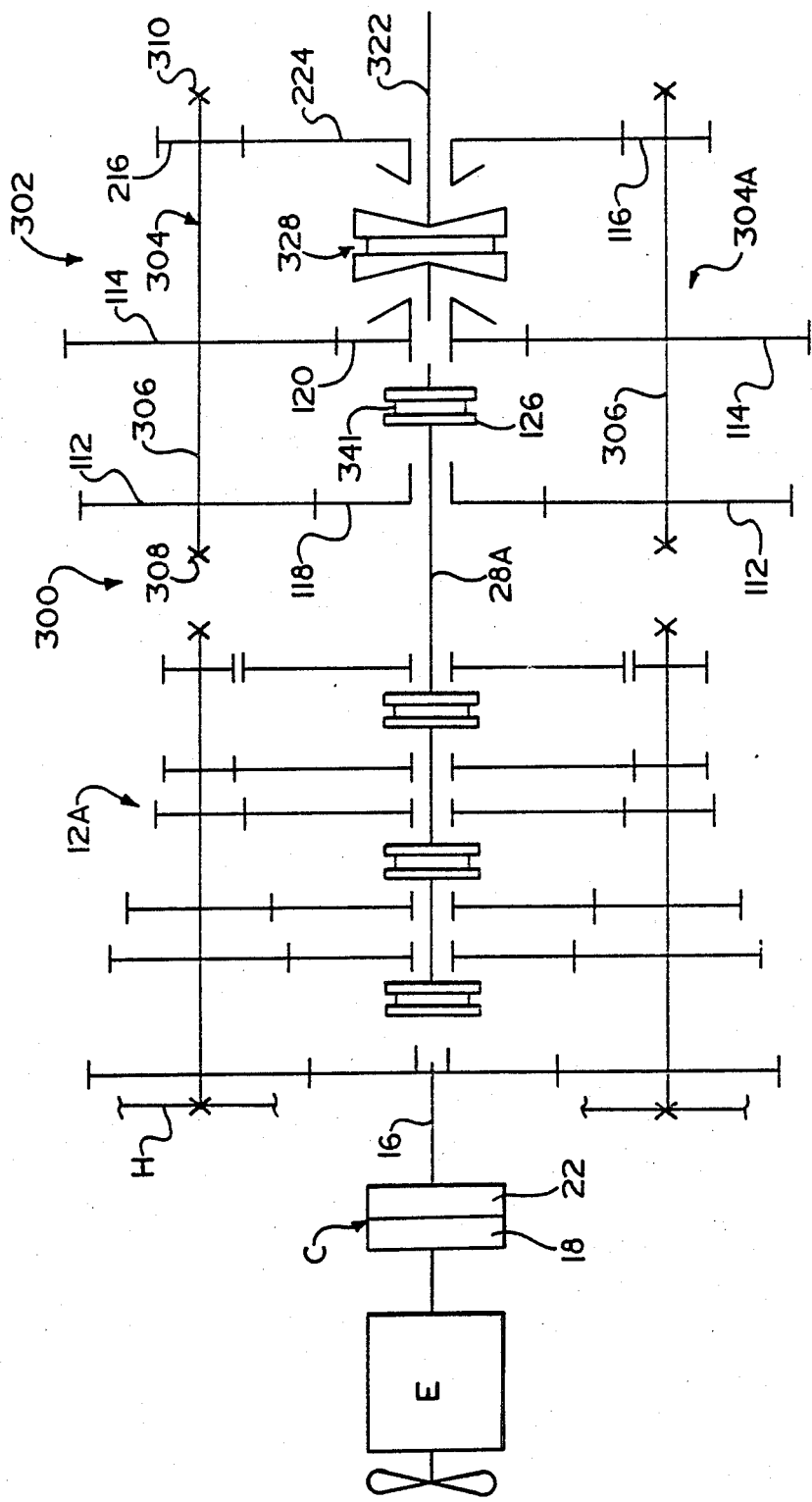
FIG. 4 is a schematic illustration of a compound transmission having a combined range/splitter type auxiliary section utilizing the control mechanism and control method the present invention.

As may be seen by reference to FIGS. 4, 5A and 5B, by selectively axially positioning both the splitter clutch 126 and the range clutch 328 in the forward and rearward axial positions thereof, four distinct ratios of main shaft rotation to output shaft rotation may be provided. Accordingly, auxiliary transmission section 302 is a 3-layer auxiliary section of the combined range and splitter type providing four selectable speeds or drive ratios between the main section 12A and output (output shaft 322) thereof. As was the case with transmission 10 described above, in compound transmission 300 the main section 12A provides a reverse and five potentially selectable forward speeds However, one of these selectable forward gear ratios (gear 56) is often a creeper or low gear not intended to be used in the high range. Thus transmission 100 is properly designated as a $(4+1)\times(2)\times(2)$ type transmission providing 17 or 18 selectable forward speeds depending upon the desirability and/or practicality of splitting the low or creeper gear.

Figure 4A:
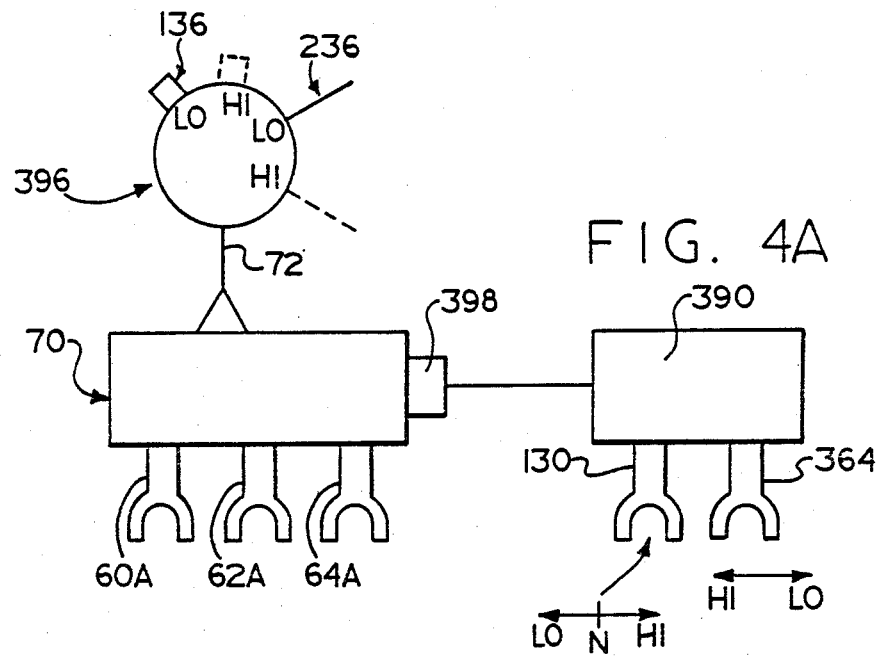
FIG. 4A is a schematic illustration of the control mechanism for controlling the transmission of FIG. 4.
Figure 4B:
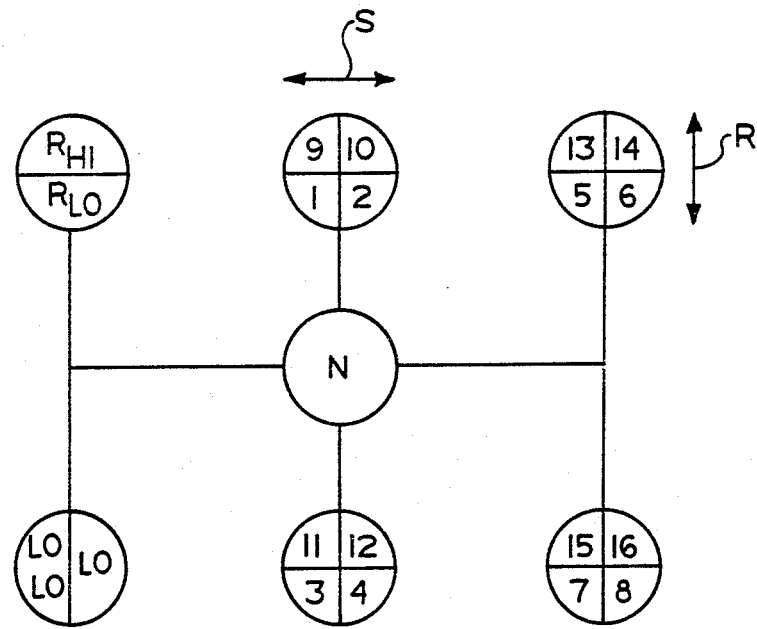
FIG. 4B is a schematic illustration of the shift pattern for the transmission of FIG. 4.

The shift pattern for shifting transmission 300 is schematically illustrated in FIG. 4B. As with FIGS. 2B and 3B, divisions in the vertical direction illustrate range shifts while divisions in the horizontal direction illustrate splitter shifts.

A method of selecting desirable gear ratios is schematically illustrated by reference to FIG. 6. Disregarding the creeper (illustrated in dashed lines) and reverse ratios, and assuming that it is desirable that a transmission have generally equal ratio steps, the main section ratio steps should be generally equal, the splitter step should be generally equal to the square root of the main section ratio steps and the range step should equal about the main section ratio step raised to the N power where N equals the number of main section ratio steps occurring in both ranges (i.e. N=4 in the (4+1)×(2)×(2) transmission). Given the desired ideal ratios, gearing to approximate these ratios is selected.

Referring to FIGS. 4, 5A and 5B, and assuming by way of example that gears 118, 120, 224, 112, 114 and 216, respectively, have 40, 38, 54, 41, 45 and 19 teeth each, respectively, the following four auxiliary section ratios are obtainable:

1. Clutch 126 engaged to gear 120 and clutch 328 engaged to gear 224 provides an auxiliary section reduction of about 3.365:1;
2. Clutch 126 engaged to gear 118 and clutch 328 engaged to gear 224 provides an auxiliary section reduction of about 2.913:1;
3. Clutch 126 engaged to gear 120 and clutch 328 engaged to gear 120 provides an auxiliary section reduction about 1.000:1; and
4. Clutch 126 engaged to gear 118 and clutch 328 engaged to gear 120 provides an auxiliary section reduction of about 0.865:1.

In the above example, the splitter steps are about 15.6% while the range step is about 336.6% which is generally suitable for a "4+1" main transmission section having about 35% steps as the square root of 1.35 equals about 1.16 and 1.35 raised to fourth power (i.e. when N=4) equals about 3.32. FIG. 7 illustrates the various gears engaged for the various selectable forward speeds of transmission 300. It is noted that 8-9 and 9-8 shifts are extremely complex as a main section shift as well as a combined range and splitter auxiliary section shift is required.

Synchronized clutch 328 is a two position clutch which, depending upon the position of range selector switch 236 of the combined splitter/range selection valve 396 is either in the rightwardmost or leftwardmost positions thereof to couple the output shaft 322 with either gear 224 or gear 120. Accordingly, except during a brief shift transient during a range shift (i.e. such as an 8-9 speed gear change) clutch 328 engages the output shaft to either gear 120 or 224. Accordingly, the output shaft 322, gears 118, 120 and 224 and the auxiliary countershaft assemblies 304 and 304A, all of which are rotatably connected to the input shaft by means of clutch 328 comprise the output component of transmission 300. Similarly, input shaft 16, input gear 24, mainshaft gears 50, 52, 54, 56 and 58 and the countershaft assemblies 26 and 26A, all of which are constantly rotatably coupled to the input shaft are the input components of transmission 300. Mainshaft 28A and the clutch member 60, 62, 64 and 126 comprise the relatively low rotational inertia connecting component of transmission 300.

The control apparatus for controlling the gear changing of transmission 300 may be seen by reference to FIG. 4A. Briefly, relatively standard shift bar housing assembly 70 is controlled by a shift lever 72 for selective axial positioning of the shift fork 60A, 62A and 64A. The position of the auxiliary section clutches 126 and 328 is controlled by the operators control valve 396 which includes a splitter selection switch 136 and a range selection switch 236. A sensor device 398 senses the position of switches 136 and 236 and provides a signal to actuate at 390 for selectively positioning the shift forks 130 and 364 in either the rightwardmost or leftwardmost positions thereof. Sensor 398 will also sense positioning of all of the main section shift forks in the neutral positions thereof, and will provide a signal of same to the actuator 390 for positioning of the shift fork 130, and clutch 126 controlled thereby, in the neutral position thereof for placing the connecting member of transmission 300 in the low rotational inertia condition thereof for ease of shifting the main transmission section 12A.

The operation of transmission 300 in all but a shift involving the range clutch 328 is substantially identical to the shifting of transmission 100 described above and will not be described again in detail. In a gear change involving the shifting of both the range clutch 328 and the splitter clutch 126 as well as a shift in the main transmission section 12A (i.e. such as a shift from 8th to 9th gear) the following procedure is followed. The desired position of the range and of the splitter clutches is preselected by proper position of switches 236 and 136. The operator will then cause a break in torque by decreasing the supply of fuel to engine E and/or by disengaging the clutch C and will shift the main transmission section 12A to neutral. At this time, by operation of the synchronizing mechanism of synchronized clutch 328, the range clutch 328 will almost immediately engage in the preselected position thereof. Simultaneously, the splitter clutch 126 will move to the neutral or center position thereof to decouple the coupling member from the inertia of the output member of transmission 300 allowing a selected gear in the main transmission section to be easily and smoothly engaged. Upon engagement of the main transmission section, the sensor 398 will sense that the main transmission section is no longer in the neutral condition and the actuator 390 will bias the splitter clutch 126 towards the preselected position thereof. The operator will then be required to manipulate the throttle to cause the jaw clutch members to be engaged of the clutch 126 to pass through synchronous whereupon the selected jaw clutch members will engage.

It is important to note that the positive clutch members 126 and 76 carry clutch teeth 334 and 336 at a considerably larger radius then do clutch members 60, 62 and 64 in the main transmission section 12A and thus are of a relatively greater mass and are subject to closer control of the backlash thereof. Additionally, transmission section 12A are typically controlled by means of a shift bar housing 70 operated by a shift lever 72 which allows the operator to exert a considerable mechanical advantage applying a relatively larger axial force to the sliding clutch members which will permit the operator to force a considerably asynchronous engagement of a particular clutch member.

Accordingly, it may be seen that an improved change gear transmission allowing a relatively simple shifting thereof has been provided.

The description of the preferred embodiments of the present invention have been made by way of example only and various modifications and/or rearrangement of the parts are contemplated without departing from the spirit and the scope of the invention as hereinafter claimed.

We claim:

1. A change gear mechanical transmission comprising:
   an input component comprising an input shaft, an input gear adapted to be rotationally fixed to said input shaft, at least one countershaft carrying a plurality of countershaft gears thereon, one of said countershaft gears constantly meshed with said input gear and a plurality of mainshaft gears constantly meshed with other of said countershaft gears;
   a connecting component comprising a mainshaft and a plurality of first mainshaft clutch members and a second mainshaft clutch member rotationally fixed to said mainshaft, said connecting component independently rotatable of said input component;
   an output component comprising an output shaft, said output component independently rotatable of said connecting component;
   said mainshaft gears selectively clutchable one at a time to said mainshaft by first clutch means including said first clutch members;
   said output component drivingly engagable and disengagable to said mainshaft by second clutch means including said second clutch members;
   control means allowing manual selection of engaged and disengaged positions for said first clutch means and for positioning said second clutch means in an engaged or a disengaged position, said transmission characterized by:
   said control means including means for sensing the positioning of all of said first clutch means in the disengaged positions thereof, and for automatically positioning said second clutch means in the disengaged position thereof in response thereto.

2. The transmission of claim 1 wherein said first and second clutch means are non-synchronized positive jaw clutches, the interengagable jaw clutch members of said second jaw clutch means having a lower backlash than the interengagable jaw clutch members of said first clutch means whereby said second clutch means will be more resistant to asynchronous engagement than said first clutch means.

3. The transmission of claim 2 wherein the maximum force urging said jaw clutch members of said first clutch means into engagement is greater than the maximum force utilized to urge the jaw clutch members of said second jaw clutch means into engagement.

4. The transmission of claim 3 wherein the force urging said jaw clutch members of said second clutch means into engagement exert a resilient force on said jaw clutch members.

5. The transmission of claim 4 wherein the leading edges of said jaw clutch members said second clutch means are inclined at an angle in the range of 30° to 40° with respect to the axis of rotation of said jaw clutch members.

6. The transmission of claim 2 wherein said input gear in rotationally fixed to said input shaft and said input gear in selectively clutchable to said mainshaft by said first clutch one arms.

7. The transmission of claim 1 wherein said first and second clutch means are non-synchronized positive jaw clutches, the interengagable jaw clutch members of said second jaw clutch means having a lower backlash than the interengagable jaw clutch members of said first clutch means whereby said second clutch means will be more resistant to asynchronous engagement than said first clutch means.

8. The transmission of claim 7 wherein the maximum force urging said jaw clutch members of said first clutch means into engagement is greater than the maximum force utilized to urge the jaw clutch members of said second jaw clutch means into engagement.

9. The transmission of claim 8 wherein the force urging said jaw clutch members of said second clutch means into engagement exert a resilient force on said jaw clutch members.

10. The transmission of claim 9 wherein the leading edges of said jaw clutch members said second clutch means are inclined at an angle in the range of 30° to 40° with respect to the axis of rotation of said jaw clutch members.

11. A combined range and splitter type compound change gear transmission comprising a main transmission section connected in series with an auxiliary transmission section, said auxiliary transmission section comprising a housing, an auxiliary section input shaft extending into said housing and driven by said main transmission section and an output shaft extending from said housing, said main transmission section comprising a plurality of main transmission section positive clutches for selectively drivingly engaging selected main section gearing to said auxiliary section input shaft, said auxiliary transmission section comprising:
   a splitter gear, a splitter/range gear and a range gear all generally coaxial with and rotatable relative to said auxiliary section input shaft and said output shaft;
   an auxiliary section countershaft assembly comprising an auxiliary section countershaft rotationally supported in said housing, a first auxiliary countershaft gear rotatably fixed to said auxiliary countershaft and constantly meshed with said splitter gear, a second auxiliary countershaft gear rotationally fixed to said auxiliary countershaft and constantly meshed with said splitter/range gear and a third auxiliary countershaft gear rotationally fixed to said auxiliary countershaft and constantly meshed with said range gear;
   a splitter clutch assembly fixed for rotation with said auxiliary section input shaft and having a first position for coupling said splitter gear to said auxiliary section input shaft and a second position for coupling said splitter/range gear to said auxiliary section input shaft;
   a two-position synchronized range clutch assembly fixed for rotation with said output shaft and having a first position for coupling said splitter/range gear to said output shaft and a second position for coupling said range gear to said output shaft; and,
   control means independently positioning each of aid splitter clutch assembly and range clutch assembly in a selected one of the two positions thereof, said transmission characterized by;
   said control means allowing positioning and maintaining of said splitter clutch in a third position thereof for drivingly disconnecting said splitter gear and said splitter/range gear from said auxiliary section input shaft and further including means for sensing disengagement of all of said main section gearing from said auxiliary section input shaft and for automatically positioning said splitter clutch in the third position thereof in response thereto.

12. The compound transmission of claim 11 wherein said splitter clutch assembly includes a double/sided positive clutch member having positive clutch teeth on opposite axial ends thereof.

13. The transmission of claim 12 wherein said first and second clutch means are non-synchronized positive jaw clutches, the interengagable jaw clutch members of said second jaw clutch means having a lower backlash than the interengagable jaw clutch members of said first clutch means whereby said second clutch means will be more resistant to asynchronous engagement than said first clutch means.

14. The transmission of claim 13 wherein the maximum force urging said jaw clutch members of said first clutch means into engagement is greater than the maximum force utilized to urge the jaw clutch members of said second jaw clutch means into engagement.

15. The transmission of claim 14 wherein the force urging said jaw clutch members of said second clutch means into engagement exert a resilient force on said jaw clutch members.

16. The transmission of claim 15 wherein the leading edges of said jaw clutch members said second clutch means are inclined at an angle in the range of 30° to 40° with respect to the axis of rotation of said jaw clutch members.

17. The transmission of claim 13 wherein said main transmission section provides a plurality of selectable forward speed ratios, having substantially equal ratio steps, between the transmission input shaft and said auxiliary transmission input shaft, and wherein:

(A/D)×(E/B) is generally equal to the square root of the average main transmission section ratio step, and (C/F)×(E/B) is generally equal to the average main transmission ratio step raised to the N power, wherein:

A = number of teeth on the splitter gear,
B = number of teeth on the splitter/range gear,
C = number of teeth on the range gear,
D = number of teeth on the first auxiliary countershaft gear,
E = number of teeth on the second auxiliary countershaft gear,
F = number of teeth on the third auxiliary countershaft gear, and
N = number of selectable main transmission section forward ratios utilized in both the high and the low ranges.

18. A method for controlling change gear transmissions of the type comprising:

an input component comprising an input shaft, an input gear rotationally fixed to said input shaft, at least one countershaft carrying a plurality of countershaft gears thereon, one of said countershaft gears constantly meshed with said input gear and a plurality of mainshaft gears constantly meshed with other of said countershaft gears;

a connecting component comprising a mainshaft and a plurality of first and second positive mainshaft clutch members rotationally fixed to said mainshaft, said connecting component independently rotatable of said input component; and an output component comprising an output shaft, said output component independently rotatable of said connecting component, said input gear and mainshaft gears selectively clutchable one at a time to said mainshaft by first clutch means including said first clutch members, said output shaft selectively drivingly engaged and disengaged to said mainshaft by second clutch means including said second clutch member; and manually operated control means for selectively positioning said first clutch means in the engaged and disengaged positions thereof;

said method characterized by:

sensing positioning of all of said first clutch means in the disengaged positions thereof, providing a signal indicative of all of said first clutch means in the disengaged positions thereof, responding to said signal by automatically causing said second clutch means to assume the disengaged position thereof to drivingly disengage said output shaft from said mainshaft.

19. The method of claim 18 comprising the additional step of causing said second clutch means to re-engage said output shaft and mainshaft upon sensing one of said first clutch means in the engaged the second clutch, will not tend to cause re-engagement at greater than a predetermined amount of asynchronous rotation.

* * * * *